(12) United States Patent
Noh et al.

(10) Patent No.: US 12,105,488 B2
(45) Date of Patent: Oct. 1, 2024

(54) ELECTRONIC DEVICE AND METHOD OF CONTROLLING OVERHEAT BASED ON USER ACTIVITY IN THE ELECTRONIC DEVICE

(71) Applicant: Samsung Electronics Co., Ltd., Gyeonggi-do (KR)

(72) Inventors: Hyunjin Noh, Gyeonggi-do (KR); Sungyong Bang, Gyeonggi-do (KR); Jaeho Kim, Gyeonggi-do (KR); Jongwoo Kim, Gyeonggi-do (KR); Hakryoul Kim, Gyeonggi-do (KR); Youngcheol Sin, Gyeonggi-do (KR); Mooyoung Kim, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 291 days.

(21) Appl. No.: 17/572,932

(22) Filed: Jan. 11, 2022

(65) Prior Publication Data
US 2022/0221830 A1  Jul. 14, 2022

Related U.S. Application Data

(63) Continuation of application No. PCT/KR2022/000304, filed on Jan. 7, 2022.

(30) Foreign Application Priority Data

Jan. 13, 2021 (KR) .................. 10-2021-0004468

(51) Int. Cl.
*G05B 15/02* (2006.01)
(52) U.S. Cl.
CPC .................. *G05B 15/02* (2013.01)

(58) Field of Classification Search
CPC ...................................................... G05B 15/02
See application file for complete search history.

(56) References Cited

U.S. PATENT DOCUMENTS 5,996,084 A  11/1999  Watts
6,681,336 B1  1/2004  Nokazato et al.
(Continued)

FOREIGN PATENT DOCUMENTS

CN  212112390 U  * 12/2020
EP  2 990 906 A2  3/2016
(Continued)

OTHER PUBLICATIONS

International Search Report dated Apr. 13, 2022.
European Search Report dated Feb. 6, 2024.

*Primary Examiner* — Suresh Suryawanshi
(74) *Attorney, Agent, or Firm* — Cha & Reiter, LLC

(57) ABSTRACT

According to various embodiments, an electronic device may include at least one temperature sensor, a memory, and at least one processor operatively coupled to the at least one temperature sensor and the memory to identify the electronic device is in a first overheat state based on a heat temperature of the electronic device, perform data processing in a first data processing speed range in the first overheat state, to identify a first time period and a first data processing speed corresponding to a first specified event, upon occurrence of the first specified event during the data processing corresponding to the first specified event in the first data processing speed range, perform data processing based on the first time period and the first data processing speed, and to perform data processing in the first data processing speed range based on expiration of the first time period or completion of data processing corresponding to the first specified event.

20 Claims, 10 Drawing Sheets

(56) References Cited

U.S. PATENT DOCUMENTS

| | | | |
|---|---|---|---|
| 9,641,014 B2 * | 5/2017 | Sporck | H02J 7/0071 |
| 9,671,767 B2 * | 6/2017 | Naffziger | G06F 1/3206 |
| 10,216,236 B1 * | 2/2019 | Ashwood | G06F 1/206 |
| 10,564,686 B2 * | 2/2020 | Lee | G06F 1/325 |
| 11,262,823 B2 * | 3/2022 | Kim | G06F 1/324 |
| 2003/0097603 A1 | 5/2003 | Athas | |
| 2011/0225436 A1 | 9/2011 | Beard | |
| 2012/0110352 A1 | 5/2012 | Branover et al. | |
| 2013/0120630 A1 | 5/2013 | Kim et al. | |
| 2014/0222242 A1 | 8/2014 | Poornachandran et al. | |
| 2014/0358319 A1 | 12/2014 | Sunwoo | |
| 2015/0005980 A1 | 1/2015 | Kim et al. | |
| 2015/0229155 A1 | 8/2015 | Sporck et al. | |
| 2017/0321921 A1 | 11/2017 | Chen et al. | |
| 2019/0155347 A1 | 5/2019 | Ishii et al. | |
| 2021/0165442 A1 | 6/2021 | Jung et al. | |

FOREIGN PATENT DOCUMENTS

| | | | |
|---|---|---|---|
| JP | 2000-148475 A | 5/2000 | |
| JP | 2001-5661 A | 1/2001 | |
| JP | 2010-124246 A | 6/2010 | |
| JP | 2017-152836 A | 8/2017 | |
| JP | 2017-537569 A | 12/2017 | |
| JP | 2019-95948 A | 6/2019 | |
| KR | 10-1997-0059886 B1 | 8/1997 | |
| KR | 10-0468561 B1 | 1/2005 | |
| KR | 10-2013-0051569 A | 5/2013 | |
| KR | 10-2014-0097611 A | 8/2014 | |
| KR | 10-2015-0008950 A | 1/2015 | |
| KR | 10-2016-0085640 A | 7/2016 | |
| KR | 10-2016-0145999 A | 12/2016 | |
| KR | 10-2020-0017260 A | 2/2020 | |
| WO | 2015/183528 A1 | 12/2015 | |

* cited by examiner

ELECTRONIC DEVICE AND METHOD OF CONTROLLING OVERHEAT BASED ON USER ACTIVITY IN THE ELECTRONIC DEVICE

CROSS-REFERENCE TO RELATED APPLICATIONS

This application is a continuation of International Application No. PCT/KR2022/000304 designating the United States, filed on Jan. 7, 2022, in the Korean Intellectual Property Receiving Office and claiming priority to Korean Patent Application No. 10-2021-0004468, filed on Jan. 13, 2021, in the Korean Intellectual Property Office, the disclosures or which are incorporated by reference herein in their entireties.

BACKGROUND

Field

Various embodiments relate to an electronic device and a method of controlling overheat in the electronic device.

Description of Related Art

Various electronic devices such as smart phones, tablets, personal computers (PC), portable multimedia players (PMP), personal digital assistants (PDA), laptop PCs, and wearable devices have been developed and have become widely used.

Along with the development of the underlying technology, various types of electronic devices have been developed, and the performance demands on these devices is ever-increasing. As the electronic devices evolve to meet user performance requirements, they have also grown to produce more heat and consume more power.

Controls may be implemented to prevent or reduce the occurrence of overheating (or heating) in electronic devices. When electronic devices execute overheat prevention controls, a limit may be imposed on operating temperatures predetermined by a manufacturer, or to accord with a unilaterally set temperature. Accordingly, it may be difficult for each electronic device to provide overheat controls that are optimized for a user's individual usage of a device.

For example, when the electronic device reaches a predetermined temperature or higher (e.g., and enters an overheat state), the electronic device may initiate throttling of the processor performance (e.g., a data processing speed range) (e.g., instructions, user data, or communication data) (e.g., in a central processing unit (CPU), an application processor (AP), or a communication processor (CP)), reducing its usage from a maximum level (e.g. a percentage such as 100%) to a specified level (e.g. 70%) (i.e., a specified data processing speed range). However, when a user-requested function involves performance at or above a specified performance threshold, during an overheat-limit state, it may be impossible for the electronic device to process data at the requisite speed, thereby causing user inconvenience.

SUMMARY

According to various embodiments, an electronic device and a method of controlling overheating in the electronic device is disclosed. Overheating controls may be based on actual user activity, in which even while data processing performance is restricted in an overheat state, the restriction may be temporarily lifted for a certain user-specified functions.

According to various embodiments, an electronic device and a method of controlling overheat of the electronic device based on a user activity is disclosed. A data processing speed range of a processor may be restricted in an overheat state. However, upon occurrence of a specified event based on user activity, the restriction may be temporarily lifted to enable data processing at the requisite speed for the specified event.

According to various embodiments, an electronic device may include at least one temperature sensor, a memory, a processor operatively coupled to the at least one temperature sensor and the memory. The memory may be configured to, when executed, enable the at least one processor to identify whether the electronic device is in a first overheat state based on a heat temperature of the electronic device obtained by using the at least one temperature sensor, perform data processing in a first data processing speed range in the first overheat state, identify a first time period and/or a first data processing speed corresponding to a first specified event, upon occurrence of the first specified event during the data processing in the first data processing speed range, perform data processing corresponding to the first specified event based on the first time period and/or the first data processing speed, and perform data processing in the first data processing speed range based on expiration of the first time period or completion of data processing corresponding to the first specified event.

According to various embodiments, a method of controlling overheat based on a user activity in an electronic device may include identifying whether the electronic device is in a first overheat state based on a heat temperature of the electronic device obtained by using at least one temperature sensor in the electronic device, performing data processing in a first data processing speed range in the first overheat state, identifying a first time period and/or a first data processing speed corresponding to a first specified event, upon occurrence of the first specified event during the data processing in the first data processing speed range, performing data processing corresponding to the first specified event based on the first time period and/or the first data processing speed, and based on expiration of the first time period, performing data processing in the first data processing speed range.

According to various embodiments, a non-volatile storage medium may store instructions configured to, when executed by at least one processor, cause the at least one processor to perform at least one operation. The at least one operation may include identifying whether the electronic device is in a first overheat state based on a heat temperature of an electronic device obtained by using at least one temperature sensor, performing data processing in a first data processing speed range in the first overheat state, identifying a first time period and/or a first data processing speed corresponding to a first specified event, upon occurrence of the first specified event during the data processing in the first data processing speed range, performing data processing corresponding to the first specified event based on the first time period and/or the first data processing speed, and based on expiration of the first time period or completion of data processing corresponding to the first specified event, performing data processing in the first data processing speed range.

According to various embodiments, when an electronic device restricts data processing performance to address or prevent an overheating state, the electronic device may temporarily lift the restriction for a user-desired function, thereby reducing the impact on user convenience.

According to various embodiments, when an electronic device restricts a data processing speed range in an overheating state, upon detecting a specified event corresponding to some defined user activity, the electronic device may temporarily lift the restriction to enable data processing for the specified event. Therefore, overheat prevention is preserved while the negative impact on user activities is reduced.

It will be appreciated by persons skilled in the art that the objects that could be achieved with the disclosure are not limited to what has been particularly described hereinabove and the above and other objects that the disclosure could achieve will be more clearly understood from the following detailed description.

BRIEF DESCRIPTION OF THE DRAWINGS

In relation to the description of the drawings, the same or similar reference numerals may be used to denote the same or similar components.

DETAILED DESCRIPTION

The terms as used in the disclosure are provided to merely describe specific embodiments, not intended to limit the scope of the disclosure. Singular forms include plural referents unless the context clearly dictates otherwise. The terms and words as used herein, including technical or scientific terms, may have the same meanings as generally understood by those skilled in the art. The terms as generally defined in dictionaries may be interpreted as having the same or similar meanings as or to contextual meanings of the relevant art. Unless otherwise defined, the terms should not be interpreted as ideally or excessively formal meanings. Even though a term is defined in the disclosure, the term should not be interpreted as excluding embodiments of the disclosure under circumstances.

Figure 1:
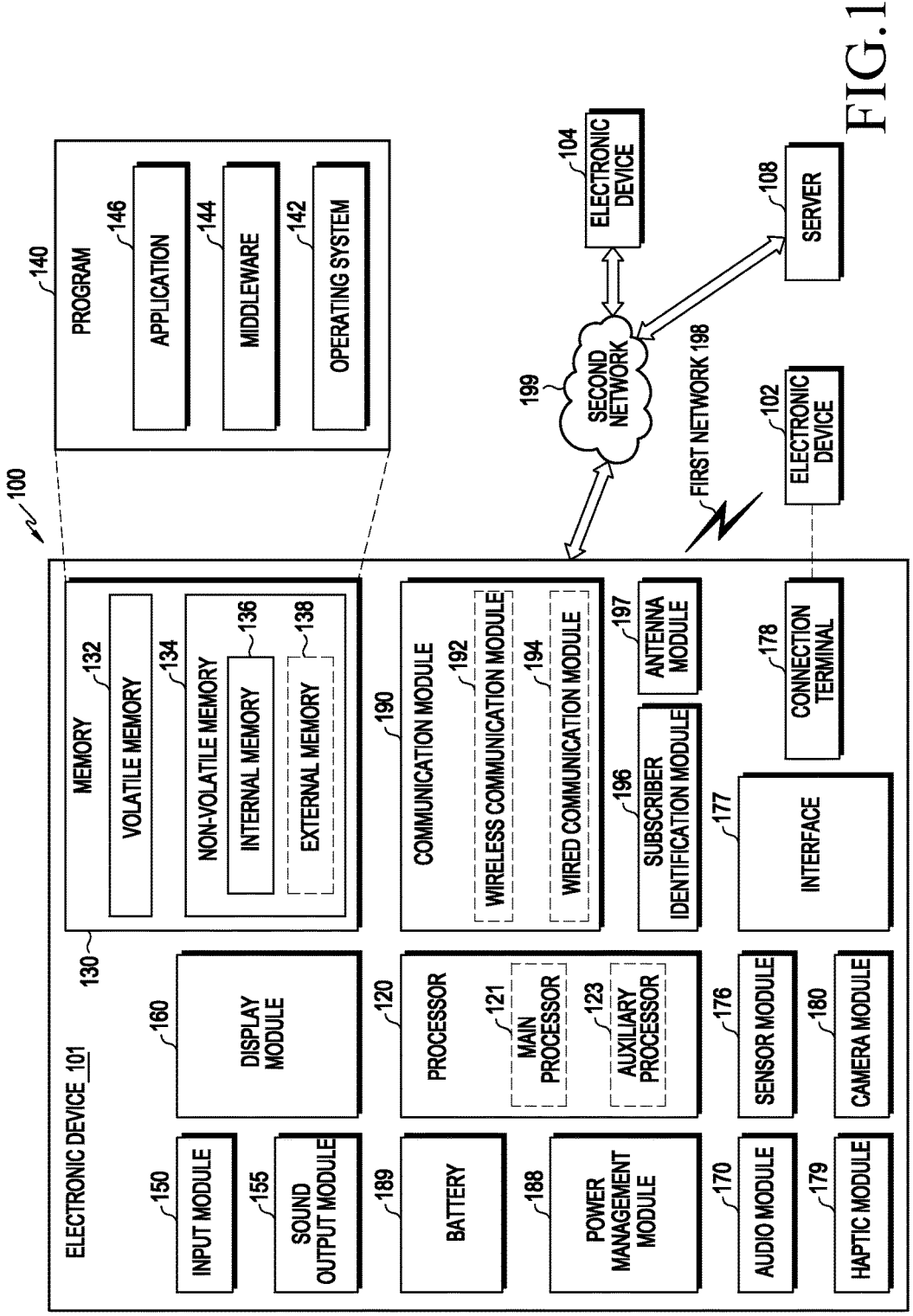
FIG. 1 is a block diagram illustrating an electronic device in a network environment according to an embodiment.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
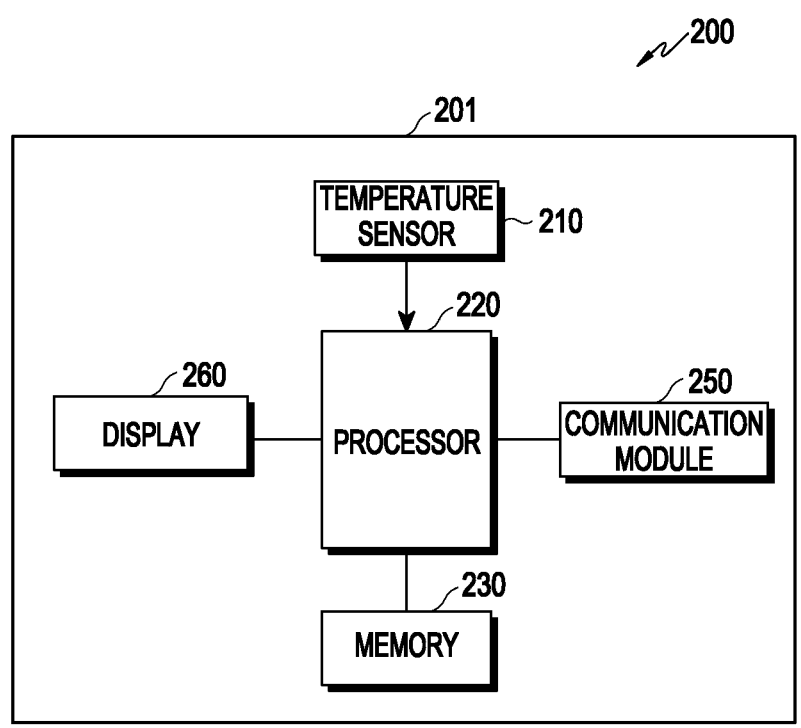
FIG. 2 is a block diagram illustrating the configuration of an electronic device according to an embodiment.

FIG. 2 is a block diagram illustrating the configuration of an electronic device according to an embodiment.

Referring to FIG. 2, an electronic device 201 according to an embodiment may include, for example, the whole or part of the electronic device 101 illustrated in FIG. 1. According to an embodiment, the electronic device 201 may include a temperature sensor 210 (e.g., the sensor module 176 of FIG. 1), at least one processor 220 (e.g., the processor 120 of FIG. 1, an AP, or a CPU), a memory 230 (e.g., the memory 130 of FIG. 1), a communication module 250 (e.g., the communication module 190 of FIG. 1), and a display 260 (e.g., the display module 160 of FIG. 1). According to an embodiment, the electronic device 201 may be without at least one of the components or may additionally include other components. In FIG. 2, the term '-module' in the electronic device 201 refers to a unit of processing at least one function or operation, and a module may be implemented in hardware, software, or a combination of hardware and software. The term 'module' in the electronic device 201 may be replaced with, for example, the terms '~ circuitry', '~ unit.

According to an embodiment, the temperature sensor 210 may include at least one temperature sensor. For example, the at least one temperature sensor 210 may be a plurality of thermistors arranged inside the electronic device 201. The temperature sensor 210 may measure the temperature of at least one component (e.g., the processor 220, the communication module 250, and the display 260) included in at least one electronic device 201. For example, the temperature sensor 210 may output temperature information based on a resistance value that changes according to a temperature, or the processor 220 may identify the temperature information. According to various embodiments, the temperature sensor 210 may be disposed inside, on a surface of, or adjacent to at least one component included in the electronic device 201.

According to various embodiments, the temperature sensor 210 may operate under the control of the processor 220. The temperature sensor 210 may transmit temperature information (e.g., a resistance value, raw data, a temperature value, a temperature state, or an overheat state) to the processor 220 in response to a command from the processor 220, and the processor 220 may identify (or determine or obtain) the temperature of at least one component (e.g., the processor 220) in response to the reception of the temperature information. According to an embodiment, the temperature sensor 210 may be disposed on a surface of the electronic device 201 or at a position corresponding to at least one heat source (e.g., a component designated as a heat source) among the components included in the electronic device 201. For example, the heat source may include at least one of the processor 220, the communication module 250, an antenna module (e.g., the antenna module 197 of FIG. 1), or a battery (e.g., the battery 189 of FIG. 1). The temperature sensor 210 may transmit temperature information related to a component included in the electronic device 201 to the processor 220. Alternatively, the temperature sensor 210 may be disposed adjacent to the surface of the electronic device 201. For example, the temperature sensor 210 may be disposed adjacent to the surface of the electronic device 201 in a housing (not shown) of the electronic device 201. Accordingly, the temperature sensor 210 may transmit temperature information about the surface of the electronic device 201 to the processor 220.

According to an embodiment, the processor 220 may identify (or obtain) temperature information about the electronic device 201 or temperature information about the heat source included in the electronic device 201 by using the temperature sensor 210. Alternatively, the processor 220 may identify (or obtain) a heat temperature by using temperature information from at least one temperature sensor 210 disposed adjacent to the surface of the electronic device 201. For example, the processor 220 may identify the heat temperature of the electronic device 201 (or at least one component included in the electronic device 201) by periodically identifying the temperature information obtained through the temperature sensor 210 according to a specified periodicity.

According to an embodiment, the processor 220 may use the temperature information obtained through the at least one temperature sensor 210 and an algorithm (e.g., a linear regression analysis algorithm) for overheat prediction stored in the memory 230 to identify (or determine) the heat temperature. For example, the processor 220 may identify (or determine) the heat temperature based on the temperature information identified from the temperature sensor 210 and prediction through the linear regression analysis algorithm based on an operation type of the electronic device (e.g., the electronic device 101 of FIG. 1 or the electronic device 201 of FIG. 2). For example, the operation type of the electronic device 101 or 201 may be identified based on the operation characteristics of one or more components which are operating (or executed or driven or on or activated) among the components included in the electronic device 101 or 201. For example, the operation type of the electronic device 101 or 201 may be specified based on the operation characteristics of at least one component of the electronic device 101 or 201. For example, a first operation type may be defined based on the operation characteristics (e.g., a charging current intensity (e.g., 1A, 2A, or any other current intensity) of a power management module (e.g., the power management module 188 of FIG. 1) (or a charger IC) among components included in the electronic device 101 and the operation characteristics (e.g. a volume level (e.g. 7, 5, mute, or any other volume level)) of the sound output module 155 (or a speaker). A second operation type may be defined based on the brightness of the display module 260 or whether the display module 260 has a high refresh rate. A third operation type may be defined based on a transmission/reception power value of the antenna module (e.g., the antenna module 197 of FIG. 1). A fourth operation type may be defined based on an on/off state of a Bluetooth module (e.g., the communication module 190 of FIG. 1). A fifth operation type may be defined based on an on/off state of a 5G communication function of the communication module 190. Various other operation types may be defined based on the operation characteristics of various components, alone or in combination. For example, the processor 220 may predict a first heat temperature based on the operation characteristics (e.g., a charging current intensity and a speaker volume level) of the first operation type according to identified first temperature information, and identify (or determine) the predicted first heat temperature as the heat temperature of the electronic device 201.

According to an embodiment, the processor 220 may identify (or obtain) a predicted heat temperature through machine-learning related to the operation type of the electronic device 201. For example, the processor 220 may learn temperature information corresponding to each operation type and identify a heat temperature according to each operation type by using information obtained from the machine-learning.

According to an embodiment, the processor 220 may identify whether the heat temperature is equal to or higher than a first specified temperature (e.g., a first temperature threshold) or a second specified temperature (e.g., a second temperature threshold). According to an embodiment, the first specified temperature may be a temperature of the electronic device 201 (or at least one component of the electronic device 201) which makes a user of the electronic device 201 feel uncomfortable due to overheat, when the user uses the electronic device 201. The first specified temperature may be the first temperature threshold (e.g., about 38 degrees Celsius) and stored in the memory 230. According to an embodiment, the second specified temperature may be a temperature higher than the first specified temperature, at which the electronic device 201 (or at least one component of the electronic device 201) may malfunction or may be damaged. The second specified temperature may be the second temperature threshold (e.g., about 47 degrees Celsius) and stored in the memory 230. For example, the first temperature threshold and/or the second temperature threshold may be set to one of various values according to the performance and external environment of the electronic device 201. When the heat temperature is equal to or higher than the first specified temperature or when the heat temperature is equal to or higher than the first specified temperature and lower than the second specified temperature, the processor 220 may identify (or determine) the state of the electronic device 201 as a first overheat state.

When the heat temperature is equal to or higher than the second specified temperature, the processor 220 may identify (or determine) the state of the electronic device 201 as a second overheat state.

According to an embodiment, when the heat temperature is lower than the first specified temperature, the processor 220 may perform normal data processing. For example, when the temperature is lower than the first specified temperature, the processor 220 may perform data processing using a data processing speed range (e.g. an unmodified data processing speed range) available for the processor 220, without a overheat control operation (e.g., overheat control operation by using a clock speed to which the processor is set at from the manufacturer). According to an embodiment, when identifying the state of the electronic device 201 as the first overheat state, the processor 220 may perform data processing in a first data processing speed range (or a second data processing speed range) that throttles (e.g., limits) the data processing speed to less than its original data processing speed. For example, the data processing speed may include a clock speed range of the processor 220 (e.g., a CPU). For example, the first data processing speed may include a first clock frequency range (e.g., 0 Hz to 1.4 GHz), and the second data processing speed may include a second clock frequency range (e.g., 0 Hz to 1.7 GHz. According to an embodiment, the processor 220 may identify whether to perform user activity-based overheat control (or specified event-based overheat control) or activate a user activity-based overheat control function (or a specified event-based overheat control function) in the first overheat state. For example, the processor 220 may identify whether the processor 220 is configured to perform data processing based on the first data processing speed range regardless of occurrence of a specified event (or user activity) in the first overheat state or data processing based on the second data processing speed range in consideration of occurrence of a specified event (or user activity) in the first overheat state. When the processor 220 is configured to perform the specified event-based overheat control, the processor 220 may perform data processing based on the first data processing speed range, whereas when the processor 220 is configured not to perform the specified event-based overheat control, the processor 220 may perform data processing based on the second data processing speed range. For example, the first data processing speed range may be more limited than the second data processing speed range. For example, a maximum processing speed value (or maximum clock frequency value) of the first data processing speed range may be less than that of the second data processing speed range.

According to an embodiment, when identifying the state of the electronic device 201 as the second overheat state, the processor 220 may perform data processing in a third data processing speed range that is even more throttled and limited than the first data processing speed range and the second data processing speed range. For example, the third data processing speed range may include a third clock frequency range (e.g., 0 Hz to 1.1 GHz). For example, a maximum processing speed value (or maximum clock frequency value) of the third data processing speed range may be less than that both of the first data processing speed range and the second data processing speed range.

According to an embodiment, the processor 220 may identify whether a specified event has occurred during the data processing in the first data processing speed range in the first overheat state. For example, the specified event may be an event related to a user activity (or an operation of the electronic device 201 based on interaction between the user and the electronic device 201). In another example, the specified event may include an event occurring through at least one piece of software (e.g., operating system) executed (or executed) in the processor 220. For example, the specified event may be at least one of a plurality of events that the electronic device 201 is capable of processing (or executing). For example, the specified event may include at least one event specified at the time of development or manufacturing of the electronic device 201 or specified through at least one piece of software (e.g., operating system) executed in the electronic device 201. For example, the at least one specified event may be an event related to a user activity, including a touch event, a scroll event, a video playing event, a camera shooting event, a camera recording event, a screen-on event, a display screen switching event, a smart stay event, and/or other events related to operations of the electronic device. The touch event may be an event that occurs when the user applies a touch input to the display 260 (e.g., the display module 160 of FIG. 1). The scroll event may be an event that occurs when the user applies a scroll input to the display 260 (e.g., the display module 160 of FIG. 1). The video playing event may be an event that occurs when a video play request input is received from the user. The video recording event may be an event that occurs when a video recording request input is received from the user. The screen-on event may be an event that occurs when the screen is turned on based on a user input. The display screen switching event may be an event that occurs when screen switching takes place on an application execution screen (e.g., an Internet browser application screen or a game application screen) displayed on the display 260. The smart stay event may be an event that occurs when the electronic device 201 starts a smart stay operation. For example, the specified event is at least one specified event that occurs through at least one piece of software running in the processor 220, including, for example, an event of communication data transmission/reception and a call reception event through the communication module 250. The communication data transmission/reception event may include an event of receiving a signal indicating the presence of data to be received from a network (e.g., the second network 199 of FIG. 1 or a BS) or an event of indicating starting of transmission of scheduled transmission data. The call reception event may include an event of indicating that the electronic device 201 has received a call from another user.

Those skilled in the art will readily understand that the types of specified events are not limited to the above-described events according to various embodiments. For example, among events and/or instructions that the electronic device 201 is capable of processing, events and/or instructions which have been stored by being mapped to information (e.g., a flag value or a file) indicating that they are designated in the memory 230 may correspond to the specified events.

According to an embodiment, upon occurrence of a specified event during the data processing in the first data processing speed range in the first overheat state, the processor 220 may identify a required (or desired) performance level for processing the specified event (e.g., a time period and/or a data processing speed for processing the specified event). According to an embodiment, the processor 220 may perform data processing at a data processing speed for processing the specified event based on the data processing speed for processing the specified event or perform data processing at the data processing speed for processing the specified event during a time period for processing the specified event based on the data processing speed and time period for processing the specified event. For example, the processor 220 may perform data processing at the data processing speed for processing the specified event, ignoring the first data processing speed range (or releasing the setting of the first data processing speed range, or temporarily releasing the first overheat state) during the time period for processing the specified event.

According to an embodiment, upon occurrence of a first specified event (e.g., a touch event) during the data processing in the first data processing speed range in the first overheat state, the processor 220 may identify a first time period (e.g. 100 ms) and a first data processing speed (e.g., 2.2 GHz) for processing the first specified event. According to an embodiment, the processor 220 may perform data processing based on the first time period and/or the first data processing speed for processing the first specified event. For example, the processor 220 may perform data processing at the first data processing speed during the first time period, while ignoring the first data processing speed range (or releasing the setting of the first data processing speed range or temporarily releasing the first overheat state) during the first time period for processing the first specified event. For example, the first data speed may be a specified (or desired) speed for processing the first specified event, not limited to the first data processing speed range. For example, upon occurrence of a second specified event (e.g., a scroll event) during the data processing in the first data processing speed range in the first overheat state, the processor 220 may identify a second time period (e.g. 500 ms) and a second data processing speed (e.g., 2.3 GHz) for processing the second specified event. According to an embodiment, the processor 220 may perform data processing at the second data processing speed during the second time period based on the second time period and/or the second data processing speed for processing the second specified event. For example, the processor 220 may perform data processing at the second data processing speed during the second time period, while ignoring the first data processing speed range (or releasing the setting of the first data processing speed range or temporarily releasing the first overheat state) during the second time period for processing the second specified event. For example, the second data speed may be a specified (or required (or desired)) speed for processing the second specified event, not limited to the first data processing speed range. According to various embodiments, at least some of a time period and/or a data processing speed for processing a specified event may be set differently for each specified event or each specified event class (e.g., a user activity-related class, a running software-related class, a touch-related event class (e.g., touch and scroll), and a function execution class (e.g., camera shooting and video playback), or may be set equally for a plurality of events. At least some of the time periods and/or data processing speeds for processing specified events may be stored in the memory 230.

According to an embodiment, when modification of the processing speed is set without also defining a time period for executing specified event, the processor 220 may perform data processing at the modified processing speed to execute the specified event, without consideration of any time period limitation after which processing speed is to be reverted to a previous setting (e.g., releasing the modified first data processing speed range, which may also be interpreted as temporarily releasing the first overheat state). For example, a third data processing speed for processing a third specified event may be specified. For example, the third specified event may involve, for example, a short processing time. The processor 220 may perform data processing at the third data processing speed, while ignoring the first data processing speed range (or releasing the setting of the first data processing speed range, or temporarily releasing the first overheat state) during a time period in which the third specified event is processed. In other words. The processor 220 may execute the third specified event with the processor set to operate at the third data processing speed, which is different than the first data processing speed range while the third specified event is executed, and revert to the first data processing speed range after the third specified event is completed.

According to an embodiment, upon expiration of a time period for processing a specified event or upon completion of processing the specified event in the absence of a time period corresponding to the specified event, the processor 220 may perform data processing in the first data processing speed range. In other words, in other embodiments in which the time period is set, reversion of the processing speed may be executed upon expiration of the set time period for executing a specified event. This embodiment is alternative to that formerly described in which reversion occurs upon completion of processing the specified event without consideration of a set time period corresponding to the specified event.

The memory 230 according to an embodiment may store various data used by at least one component (e.g., the processor 220 and the communication module 250) of the electronic device 201. The data may include, for example, software (e.g., a program), and input data or output data for commands related to the software. For example, the memory 230 may store instructions for performing an operation of the electronic device 201 (or the processor 220). According to an embodiment, the memory 330 may store a time period and/or a data processing speed corresponding to at least one specified event.

The communication module 250 according to an embodiment may support a communication channel (a wired communication channel or a wireless communication channel) or establishment of the communication channel, and communication through the established communication channel. According to an embodiment, the communication module 250 may perform communication data transmission and reception or call reception under the control of the processor 220 or by its own communication processor.

The display 260 according to an embodiment may include a touch screen, display various display data based on an operation of the processor 220, and receive an input (e.g., a touch input, a scroll input, or other inputs) related to a specified event. For example, the display 260 may display data related to specified event-based overheat control. For example, the display 260 may display data indicating whether the electronic device 201 is in the first overheat state or the second overheat state, or display data related to data processed in a normal state, the first overheat state, and the second overheat state.

According to various embodiments, an electronic device (e.g., the electronic device 101 of FIG. 1 or the electronic device 201 of FIG. 2) may include at least one temperature sensor (e.g., the sensor module 176 of FIG. 1 or the temperature sensor 210 of FIG. 2), a memory (e.g., the memory 130 of FIG. 1 or the memory 230 of FIG. 2), and at least one processor (e.g., the processor 120 of FIG. 1 or the processor 220 of FIG. 2) operatively coupled to the at least one temperature sensor and the memory. The memory may store instructions which are configured to, when executed, enable the at least one processor to identify whether the electronic device is in a first overheat state based on a heat temperature of the electronic device obtained by using the at least one temperature sensor, to perform data processing in a first data processing speed range in the first overheat state, identify whether the electronic device is in a first overheat state based on a temperature of the electronic device detected via the at least one temperature sensor, when the electronic device is in the first overheat state, set the at least one processor to execute data processing at a first data processing speed range, store, in the memory, a first specified event, in association with a first time period and/or a first data processing speed different than the first data processing speed range, when execution of the first specified event is detected in the first overheat state, change the at least one processor to execute data processing for the first specified event from the first data processing speed range to the first data processing speed, and when detecting at least one of expiration of the first time period, and/or completion of the first specified event, revert the at least one processor from the first data processing speed to the first data processing speed range.

According to various embodiments, an electronic device (e.g., the electronic device 101 of FIG. 1 or the electronic device 201 of FIG. 2) may include at least one temperature sensor (e.g., the sensor module 176 of FIG. 1 or the temperature sensor 210 of FIG. 2), at least one processor (e.g., the processor 120 of FIG. 1 or the processor 220 of FIG. 2) operatively coupled to the at least one temperature sensor and a memory (e.g., the memory 130 of FIG. 1 or the memory 230 of FIG. 2). The memory may store instructions which are configured to, when executed, enable the at least one processor to identify whether the electronic device is in a first overheat state based on a heat temperature of the electronic device obtained by using the at least one temperature sensor, to perform data processing in a first data processing speed range in the first overheat state, identify a first time period and/or a first data processing speed corresponding to a first specified event, upon occurrence of the first specified event during the data processing in the first data processing speed range, perform data processing corresponding to the first specified event based on the first time period and/or the first data processing speed, and perform data processing in the first data processing speed range based on expiration of the first time period or completion of data processing corresponding to the first specified event.

According to various embodiments, the instructions may be configured to, when executed, enable the at least one processor further to identify a second time period and/or a second data processing speed corresponding to a second specified event, upon occurrence of the second specified event during the data processing in the first data processing speed range, perform data processing based on the second time period and/or the second data processing speed, and to perform data processing in the first data processing speed range based on expiration of the second time period or completion of data processing corresponding to the first second specified event.

According to various embodiments, the instructions may be configured to, when executed, enable the at least one processor further to perform data processing in a second data processing speed range, when the second data processing speed range is configured to be used in the first overheat state, and a first maximum processing speed of the first data processing speed range may be less than a second maximum processing speed of the second data processing speed range.

According to various embodiments, the instructions may be configured to when executed, enable the at least one processor to, based on the heat temperature of the electronic device, identify the electronic device to be in a normal state when the heat temperature is lower than a first specified temperature, identify the electronic device to be in the first overheat state when the heat temperature is equal to or higher than the first specified temperature and lower than a second specified temperature, and identify the electronic device to be in a second overheat state when the heat temperature is equal to or higher than the second specified temperature, and the second specified temperature may be higher than the first specified temperature.

According to various embodiments, the instructions may be configured to when executed, enable the at least one processor to perform data processing in a third data processing speed range in the second overheat state, and a third maximum processing speed of the third data processing speed range may be less than the first maximum processing speed of the first data processing speed range.

According to various embodiments, the memory may store at least one time period and/or at least one data processing speed corresponding to each of at least one specified event.

According to various embodiments, the at least one specified event may include an event related to an operation of the electronic device based on interaction between a user and the electronic device or an event occurred through at least one piece of software executed in the at least one processor.

According to various embodiments, the first data processing speed may include a clock frequency corresponding to the at least one processor. For example, when the electronic device 201 includes a plurality of processors, a different clock frequency may be configured for each of the plurality of processors based on the data processing speed. For example, when the electronic device 201 includes a first core (big core) processor, a second core (middle core) processor, and a third core (little core) processor, a processor to process data may be selected from among the first core (big core) processor, the second core (middle core) processor, and the third core (little core) processor, and the clock frequency may be changed to a clock frequency corresponding to the selected processor based on the data processing speed.

According to various embodiments, the first specified temperature may be about 38 degrees Celsius, and the second specified temperature may be about 47 degrees Celsius.

Figure 3:
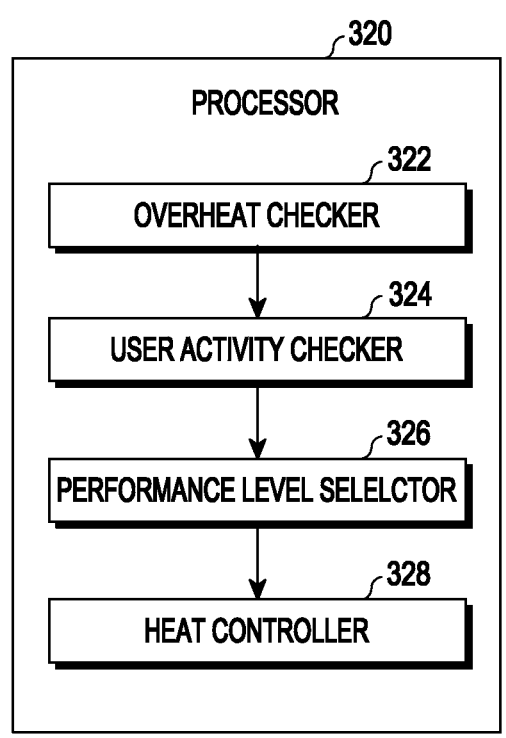
FIG. 3 is a block diagram illustrating the configuration of a processor in an electronic device according to an embodiment.

FIG. 3 is a block diagram illustrating the configuration of a processor in an electronic device according to an embodiment.

Referring to FIG. 3, a processor 320 (e.g., the processor 120 of FIG. 1 or the processor 220 of FIG. 2) of an electronic device (e.g., the electronic device 101 of FIG. 1 or the electronic device 201 of FIG. 2) (hereinafter, the electronic device 201 of FIG. 2 will be described as an example) may perform operations of an overheat checker 322, a user activity checker (or a specified event occurrence checker) 324, a performance level selector 326, and a heat controller 328. For example, at least one of the overheat checker 322, the user activity checker 324, the performance level selector 326, or the heat controller 328 may be a software module executed by the processor 320. Alternatively, at least one of the overheat checker 322, the user activity checker 324, the performance level selector 326, or the heat controller 328 may be a hardware module which is incorporated in the processor 320 or exists independently.

The overheat checker 322 according to an embodiment may obtain (or detect) the heat temperature of the electronic device 201 (e.g., the heat temperature of the surface of the electronic device 20 or the temperature of a heat-related element included in the electronic device 201) by using at least one temperature sensor (e.g., the temperature sensor 210 of FIG. 2) of the electronic device 201. For example, the overheat checker 322 may obtain the heat temperature of the electronic device 201 by periodically identifying temperature information (or a temperature value) according to a preset time period through the at least one temperature sensor 210, or may identify (or determine) the heat temperature by using the temperature information obtained through the at least one temperature sensor 210 and an algorithm (e.g., a linear regression analysis algorithm) pre-stored for heat temperature prediction. For example, the overheat checker 322 may determine a heat temperature using temperature information received from the at least one temperature sensor disposed adjacent to the surface of the electronic device 201, or obtain a predicted heat temperature based on temperature information received from the at least one temperature sensor 210, and machine-learning related to the operation type of the electronic device 201. According to an embodiment, the overheat checker 322 may check whether the heat temperature is equal to or higher than a first specified temperature (e.g., a first temperature threshold), equal to or higher than the first specified temperature and lower than a second specified temperature (e.g., a second temperature threshold), or equal to or higher than the second specified temperature. According to an embodiment, the first specified temperature may be a temperature of the electronic device 201 (or at least one component of the electronic device 201) which makes the user of the electronic device 201 feel uncomfortable due to heat when the user uses the electronic device 201. The first specified temperature may be the first temperature threshold (e.g., about 38 degrees Celsius). According to an embodiment, the second specified temperature may be a temperature higher than the first specified temperature, at which the electronic device 201 (or at least one component of the electronic device 201) may malfunction or may be damaged. The second specified temperature may be the second temperature threshold (e.g., about 47 degrees Celsius). For example, the first temperature threshold and/or the second temperature threshold may be set to one of various values according to the performance and external environment of the electronic device 201. When the heat temperature is equal to or higher than the first specified temperature or when the heat temperature is equal to or higher than the first specified temperature and lower than the second specified temperature, the overheat checker 322 according to an embodiment may determine (or identify) the state of the electronic device 201 as a first overheat state. When the heat temperature is equal to or higher than the second specified temperature, the overheat checker 322 may determine (or identify) the state of the electronic device 201 as a second overheat state.

According to an embodiment, when the state of the electronic device 201 is identified as the first overheat state, the overheat checker 322 may set a data processing speed to a first data processing speed range (e.g., a first clock frequency range or 0 Hz to 1.4 GHz) or a second data processing speed range (e.g., a second clock frequency range or 0 Hz to 1.7 GHz). For example, when the specified event-based overheat control function is activated, the overheat checker 322 may set the data processing speed to the first data processing speed range (e.g., the first clock frequency range or 0 Hz to 1.4 GHz) and operate (or activate) the user activity checker 324. For example, when the specified event-based overheat control function is deactivated, the overhear checker 322 may set the data processing speed to the second data processing speed range (e.g., the second clock frequency range or 0 Hz to 1.7 GHz) and may not operate (or activate) the user activity checker 324. For example, when the specified event-based overheat control function is used by default, the overheat checker 322 may set the data processing speed to the first data processing speed range (e.g., the first clock frequency range or 0 Hz to 1.4 GHz) and operate (or activate) the user activity checker 324, without determining whether the specified event-based overheat control function has been activated.

According to an embodiment, the user activity checker 324 may check whether a specified event has occurred. For example, the specified event may include an event related to a user activity (or an operation of the electronic device based on interaction between the user and the electronic device 201), or an event occurring through at least one piece of software being executed (e.g., executed) in the processor 220. For example, each specified event may involve a different performance level for processing the specified event (e.g., a time period and/or a data processing speed for processing the specified event). For example, each specified event may involve a specific time period and/or a specific data processing speed for processing the specified event. For example, the specified event may be designated by a manufacturer when the electronic device 201 is manufactured or may be designated based on a user input, and a desired performance level corresponding to the specified event may be stored in the electronic device 201. For example, the electronic device 201 may designate a new event or release designation of an existing specified event based on a manufacturer or a user input.

According to an embodiment, upon occurrence of a specified event during data processing in the first data processing speed range in the first overheat state, the user activity checker 324 may notify the performance level selector 326 of the occurrence of the specified event.

The performance level selector 326 according to an embodiment may identify (or select) a time period and/or a data processing speed for processing the specified event. For example, the performance level selector 326 may select the time period and/or the data processing speed for processing the specified event which has occurred from data (e.g., table data) including a time period and/or a data processing speed for processing at least one specified event. The performance level selector 326 according to an embodiment may transmit the time period and/or the data processing speed for processing the specified event to the heat controller 328.

Upon receipt of the time period and/or the data processing speed for processing the specified event from the performance level selector 326 during the data processing in the first data processing speed range, the heat controller 328 according to an embodiment may temporarily release the restriction of the first data processing speed range and perform data processing based on the time period and/or the data processing speed for processing the specified event. When the second overheat state is placed due to the rise of the heat temperature during the data processing in the first data processing speed range or during the data processing based on the time period and/or the data processing speed for processing the specified event, the heat controller 328 may control data processing to be performed within a third data processing speed range.

Figure 4:
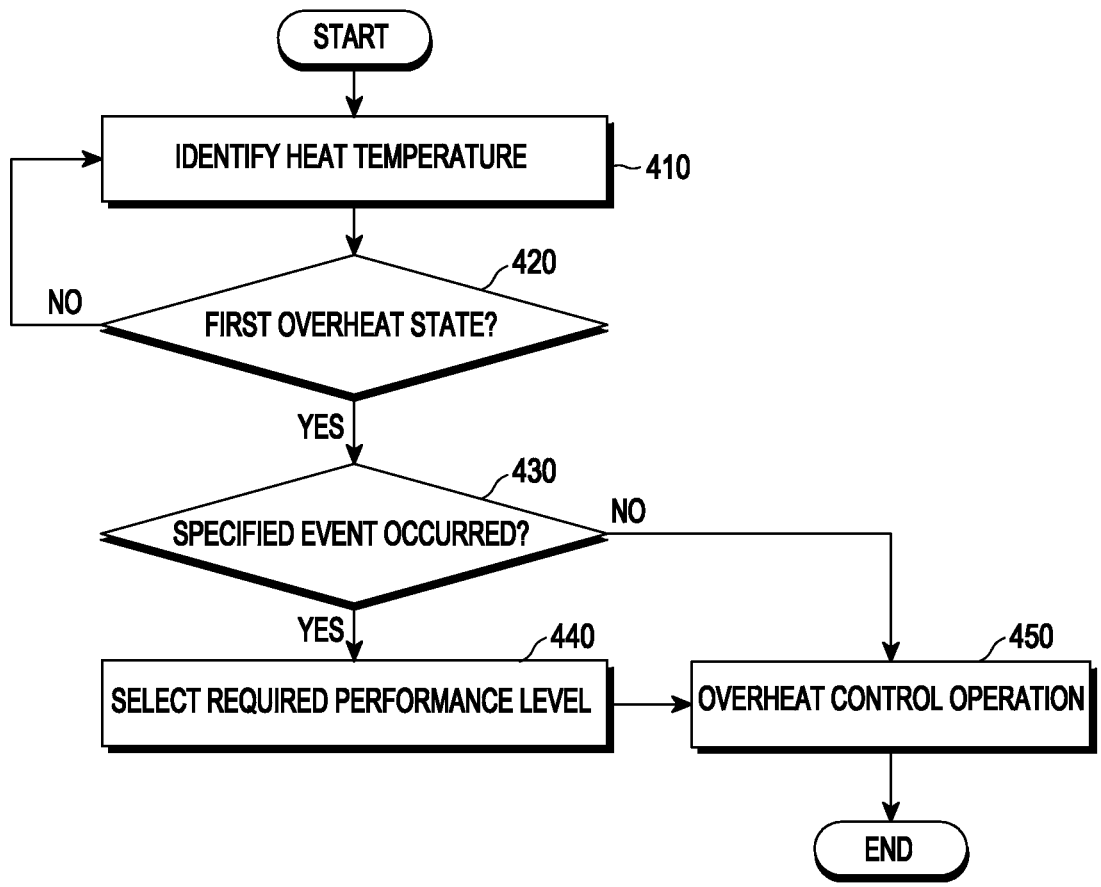
FIG. 4 is a flowchart illustrating an operation of controlling overheat based on a user activity in an electronic device according to an embodiment.

FIG. 4 is a flowchart illustrating an operation of controlling overheat based on a user activity in an electronic device according to an embodiment.

Referring to FIG. 4, a processor (e.g., the processor 120 of FIG. 1, the processor 220 of FIG. 2, or the processor 320 of FIG. 3) of an electronic device (e.g., the electronic device 101 of FIG. 1 or the electronic device 201 of FIG. 2) according to an embodiment may perform at least one of operations 410 to 450.

In operation 410, the processor 220 according to an embodiment may identify a heat temperature of the electronic device 201. The processor 220 according to an embodiment may identify a heat temperature of the electronic device 201 (e.g., the heat temperature of the surface of the electronic device 20 or the temperature of a heat-related element included in the electronic device 201) using at least one temperature sensor 210. For example, the processor 220 may identify the heat temperature of the electronic device 201 by periodically identifying temperature information (or a temperature value) according to a preset time period through the at least one temperature sensor 210, or may identify (or determine) the heat temperature by using the temperature information obtained through the at least one temperature sensor 210 and an algorithm (e.g., a linear regression analysis algorithm) pre-stored for heat temperature prediction. For example, the processor 220 may obtain a heat temperature using temperature information received from the at least one temperature sensor disposed adjacent to the surface of the electronic device 201, or obtain (identify) a predicted heat temperature based on temperature information received from the at least one temperature sensor 210, and machine-learning related to the operation type of the electronic device 201.

In operation 420, the processor 220 according to an embodiment may identify whether or not the electronic device 201 is in an overheat state. The processor 220 according to an embodiment may check whether the heat temperature is equal to or higher than a first specified temperature (e.g., a first temperature threshold), equal to or higher than the first specified temperature and lower than a second specified temperature (e.g., a second temperature threshold), or equal to or higher than the second specified temperature. According to an embodiment, the first specified temperature may be a temperature of the electronic device 201 (or at least one component of the electronic device 201) which makes the user of the electronic device 201 feel uncomfortable due to heat when the user uses the electronic device 201. The first specified temperature may be the first temperature threshold (e.g., about 38 degrees Celsius). According to an embodiment, the second specified temperature may be a temperature higher than the first specified temperature, at which the electronic device 201 (or at least one component of the electronic device 201) may malfunction or may be damaged. The second specified temperature may be the second temperature threshold (e.g., about 47 degrees Celsius). For example, the first temperature threshold and/or the second temperature threshold may be set to one of various values according to the performance and external environment of the electronic device 201. The processor 220 according to an embodiment may return to operation 410 when the heating temperature is less than the first specified temperature. When the heat temperature is equal to or higher than the first specified temperature or when the heat temperature is equal to or higher than the first specified temperature and lower than the second specified temperature, the processor 220 according to an embodiment may determine (or identify) the state of the electronic device 201 as a first overheat state. For example, the processor 220 may execute a overheat mitigation control (or a overheat prevention control) such as changing an operational clock speed range of the processor based on identifying the first overheat state. For example, the processor 220 may set at a lower clock speed and/or clock speed range (e.g., an overheat clock speed corresponding to the overheat state, or clock speed range corresponding to the overheat state), to reduce the heat generation of the electronic device and manage the overheat state. In operation 430, the processor 220 according to an embodiment may identify whether a specified event has occurred. For example, the processor 220 may identify whether a specified event has occurred in the first heating state (operation 520—Yes). For example, the specified event may include an event related to a user activity (or an operation of the electronic device based on interaction between the user and the electronic device 201), or an event occurring through at least one piece of software being executed (e.g., executed) in the processor 220. For example, each specified event may involve a different performance level for processing the specified event (e.g., a time period and/or a data processing speed for processing the specified event). For example, each specified event may involve a specific time period and/or a specific data processing speed for processing the specified event. For example, the electronic device 201 may store one or more preset functions in the memory 230. When the processor 220 detects execution of one of the one or more preset functions, it may determine that the specified event has occurred. When the electronic device does not detect execution of any of the preset functions, it may determine that the specified event has not occurred. The processor 220 according to an embodiment may proceed to operation 440 when the occurrence of a specified event is identified in the first heating state (operation 430—Yes). The processor 220 according to an embodiment may proceed to operation 450 when the occurrence of the specified event is not identified in the first heating state (operation 430—NO).

In operation 440, when the occurrence of the specified event is identified the processor 220 according to an embodiment may select a performance level corresponding to the specified event. For example, the processor 220 may identify (or select) a time period and/or data processing speed for processing the specified event. The processor 220 according to an exemplary embodiment may allow the time period and/or the data processing speed for the specified event processing to be used for heat generation control. For example, the specified event may be stored in memory as utilizing a processor clock speed greater than a clock speed corresponding to the first heating state or outside a clock speed range corresponding to the first heating state. Accordingly, the processor 220 may temporarily be set the processor 220 to operate at the higher clock speed utilized to process/execute the preset function corresponding to the specified event.

In operation 450, the processor 220 according to an embodiment may perform an overheat control operation. For example, when the occurrence of the specified event is not identified in the first heating state (operation 430—NO), the processor 220 may perform data processing (eg, a first heating control operation) within the first data processing range to lower the heating temperature. For example, when the occurrence of the specified event is identified in the first heating state and the performance level corresponding to the specified event is selected. (operation 430—YES, operation 440), the processor 220 temporarily releases the limit of the first data processing speed range, perform data processing based on a time period and/or data processing speed for processing the specified event (or the processor 220 is temporarily set at the higher clock speed to execute the preset function corresponding to the specified event). The processor 220 may be configured to perform data processing within a first data processing speed range after data processing associated with a specified event (or after the preset function is completed or after expiration of the time period associated with the specified event). For example, the processor 220 processes data by temporarily increasing the data processing rate for the specified event processing time period (or specified time period), and data processing for other events (or other operations) is performed at the first data processing rate. By performing the function, the user's desired function (or the operation corresponding to the specified event) can be processed at normal speed. These operations may ensure that the heating temperature does not increase.

Figure 5:
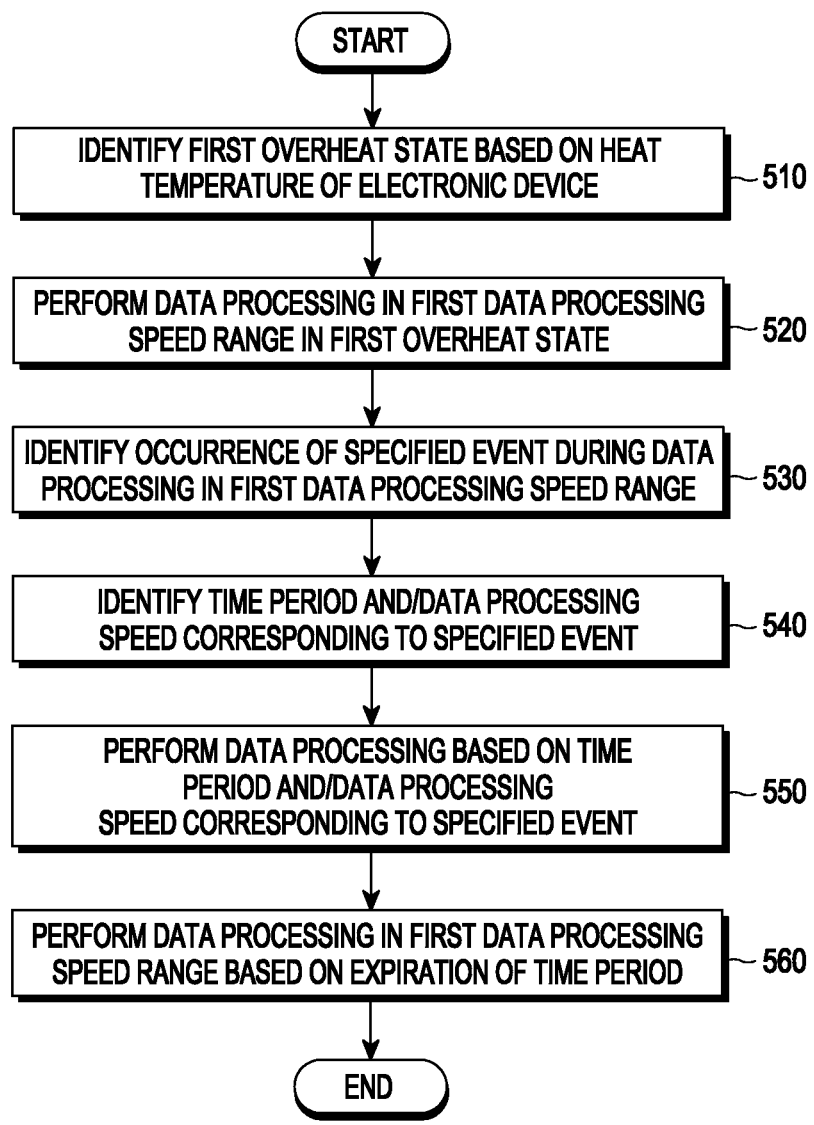
FIG. 5 is a flowchart illustrating an operation of controlling overheat, upon occurrence of a specified event based on a user activity in a first overheat state in an electronic device according to an embodiment.

FIG. 5 is a flowchart illustrating an operation of controlling overheat, upon occurrence of a specified event in a first overheat state in an electronic device according to an embodiment.

Referring to FIG. 5, a processor (e.g., the processor 120 of FIG. 1, the processor 220 of FIG. 2, or the processor 320 of FIG. 3) of an electronic device (e.g., the electronic device 101 of FIG. 1 or the electronic device 201 of FIG. 2) according to an embodiment may perform at least one of operations 510 to 560.

In operation 510, the processor 220 according to an embodiment may identify the first overheat state based on the heat temperature of the electronic device 201. For example, when the heat temperature is equal to or higher than a first specified temperature (e.g., a first temperature threshold), the processor 220 may identify (or determine) that the electronic device 201 is in the first overheat state. Alternatively, when the heat temperature is equal to or higher than the first specified temperature (e.g., the first temperature threshold) and lower than a second specified temperature (e.g., a second temperature threshold), the processor 220 may identify the state of the electronic device 201 as the first overheat state. According to an embodiment, the first specified temperature may be a temperature of the electronic device 201 (or at least one component of the electronic device 201) which causes discomfort to a user upon contact with the electronic device 201. The first specified temperature may be the first temperature threshold (e.g., about 38 degrees Celsius). According to an embodiment, the second specified temperature may be a temperature higher than the first specified temperature, at which the electronic device 201 (or at least one component of the electronic device 201) may experience malfunctions or be damaged. The second specified temperature may be the second temperature threshold (e.g., about 47 degrees Celsius). For example, the first temperature threshold and/or the second temperature threshold may be set to one of various values according to the performance and external environment of the electronic device 201.

In operation 520, the processor 220 according to an embodiment may perform data processing in the first data processing speed range in the first overheat state (e.g., an overheat-based processing speed range). For example, the processor 220 may perform data processing in the first data processing speed range (e.g., a first clock frequency range or 0 Hz to 1.4 GHz) representing a limit and/or throttling of a data processing speed to reduce heat, in response to the first overheat state.

In operation 530, the processor 220 according to an embodiment may identify occurrence of a specified event during the overheat state, in which data processing is limited/throttled via the first data processing speed range (e.g., the overheat-based processing speed range). For example, the specified event may be related to a user activity (i.e., an operation of the electronic device based on interaction between the user and the electronic device 201) and/or an event that occurs through at least one piece of software (i.e., an app or function of an operating system) executed (or executed) by the processor 220. For example, the processor 220 may identify the specified event from among a plurality of preset specified events. For example, the specified event may include a touch event, a scroll event, a video playing event, a camera shooting event, a camera recording event, a screen-on event, a display screen switching event, a smart stay event, and/or other events related to operations of the electronic device. The touch event may occur when the user applies a touch input. The scroll event may occur when the user applies a scroll input. The video playing event may occur upon reception of a video play request input from the user. The video recording event may occur upon reception of a video recording request input from the user. The screen-on event may be an event that occurs when the screen is activated based on a user input. The display screen switching event may occur when screen switching takes place on an application execution screen (e.g., an Internet browser application screen or a game application screen) displayed on the display 260. The smart stay event may occur when the electronic device 201 starts a smart stay operation. For example, the specified event may occur through at least one piece of software running in the processor 220, including, for example, execution of communication data transmission/reception and a call reception event through the communication module 250. The communication data transmission/reception event may include receiving a signal indicating the presence of data to be received from a network (e.g., the second network 199 of FIG. 1 or a BS) or indicating initiation of transmission of scheduled transmission data. The call reception event may include an indication that the electronic device 201 has received a call from another user.

In operation 540, the processor 220 according to an embodiment may identify a time period and/or a data processing speed corresponding to the specified event. For example, the processor 220 may identify the time period and/or the data processing speed for processing the specified event based on desired performance level data (e.g., table data) corresponding to at least one specified event, which are stored in the memory 230.

For example, the desired performance level data corresponding to the at least one event may be given in the form of Table 1 below.

TABLE 1

| Event | Desired performance level | |
|---|---|---|
| | Time period | Data processing speed |
| Touch | 100 ms | 2.2 GHz |
| Scroll | 500 ms | 2.3 GHz |
| Video playing | continuous | (Maximum speed in first data processing speed range) *120% |
| 30 ms | 30 ms | 2.5 GHz |
| Camera recording | continuous | (Maximum speed in first data processing speed range) *130% |
| Screen on | 4 s | Maximum speed |
| Smart stay | continuous | (Maximum speed in first data processing speed range) *120% |

Referring to Table 1, a desired performance level according to an embodiment may include a time period and a data processing speed corresponding to a specified event. For example, a first specified event (e.g., touch) may have a desired performance level representing a first time period (e.g., 100 ms) and a first data processing speed (e.g., 2.2 GHz) for processing the first specified event. For example, a second specified event (e.g., scroll) may have a desired performance level representing a second time period (e.g., 500 ms) and a second data processing speed (e.g., 2.3 GHz) for processing the second specified event. For example, a third specified event (e.g., video playing) may a desired performance level representing a third time period (e.g., continuous) and a third data processing speed (e.g., (the maximum speed in the first data processing speed range) *120%) for processing the third specified event. Each of other specified events may also have a desired performance level representing a corresponding time period and a corresponding data processing speed. Other specified events may be added to or an included specified event may be deleted from the plurality of specified events listed Table 1. It will be readily understood by those skilled in the art that the desired performance level data according to various embodiments is not limited to the form of Table 1. For example, a time period and/or a data processing speed may be included for each event class, or a data processing speed without a time period may be included according to a specified event.

In operation 550, the processor 220 according to an embodiment may perform data processing based on the time period and/or the data processing speed corresponding to the specified event. For example, the processor 220 may perform data processing at the first data processing speed corresponding to the first specified event, while ignoring the first data processing speed range (or releasing the setting of the first data processing speed range, or temporarily releasing the first overheat state) during the first time period for processing the first specified event. When the time period for processing the specified event is not defined, and the processing speed for processing the specified event is defined, the processor 220 according to an embodiment may process data processing at the processing speed for the specified event, while ignoring the first data processing speed range (or releasing the setting of the first data processing speed range, or temporarily releasing the first overheat state) during a time period in which the specified event is processed.

In operation 560, the processor 220 according to an embodiment may perform data processing in the first data processing speed range based on expiration of the time period. That is, when the time period expires, the processor 220 may revert from operation at the first data processing speed (e.g., the speed set for the specified function)_to the first data processing speed range (e.g., the overheat-based processing speed, which is slower for better management of heat generation). When the time period corresponding to the specified event processing is not defined in tandem with the processing speed (e.g., such as for the camera application in the Table above), d, the processor 220 according to an embodiment may revert operational speed of the processor from the first data processing speed (e.g., the faster speed set for the specified function) to the first data processing speed range (e.g., the overheat-based speed set for mitigate heat generation) after the specified event is finished processing and/or executing.

Figure 6:
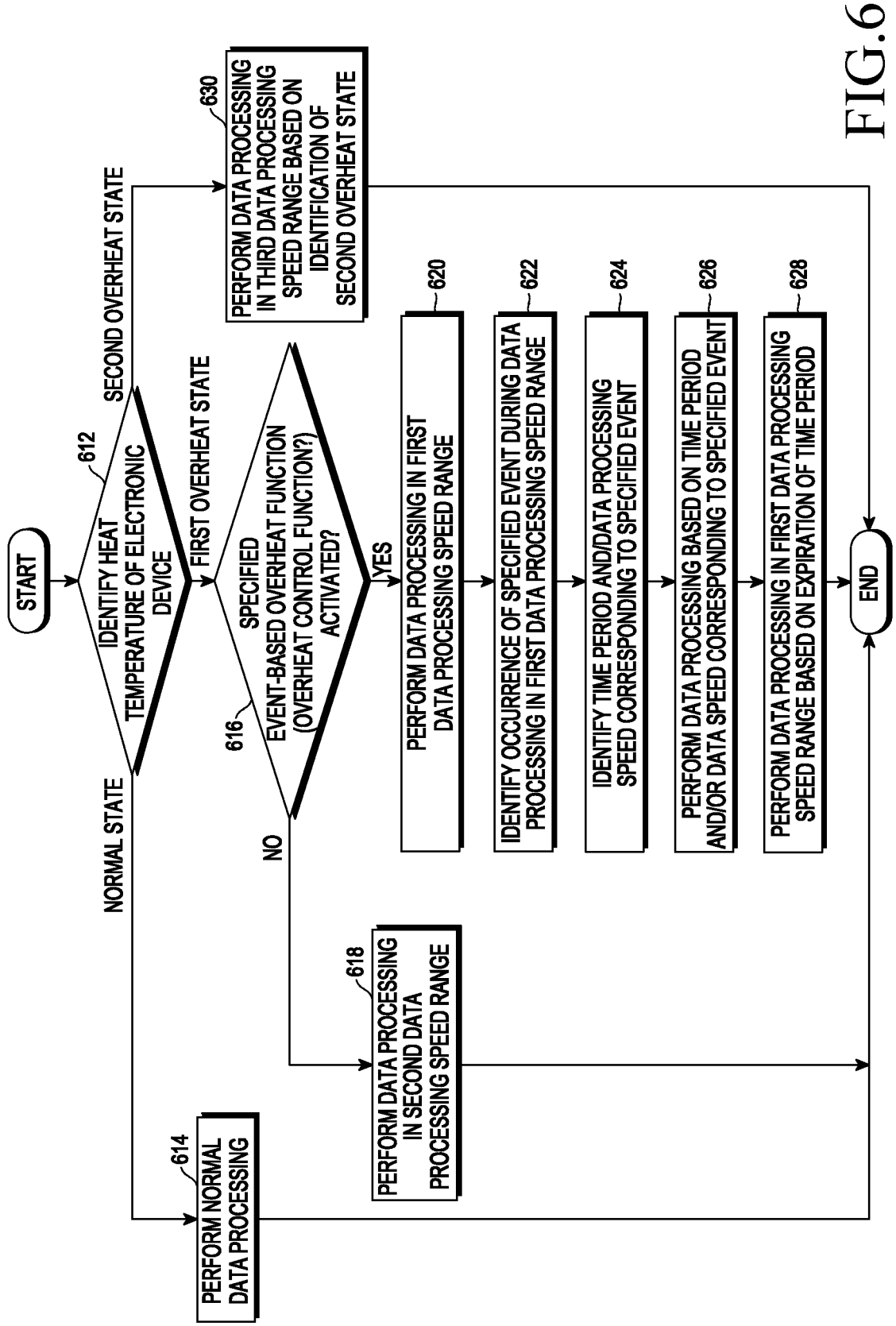
FIG. 6 is a flowchart illustrating an operation of controlling overheat in a normal state, a first overheat state, and a second overheat state in an electronic device according to an embodiment.

FIG. 6 is a flowchart illustrating an operation of controlling overheat in a normal state, a first overheat state, and a second overheat state in an electronic device according to an embodiment.

Referring to FIG. 6, a processor (e.g., the processor 120 of FIG. 1, the processor 220 of FIG. 2 or the processor 320 of FIG. 3) (hereinafter, the processor 220 of FIG. 2 will be described as an example) of an electronic device (e.g., the electronic device 101 of FIG. 1 or the electronic device 201 of FIG. 2) according to an embodiment may perform at least one of operations 612 to 628.

In operation 612, the processor 220, according to an embodiment, may identify whether the electronic device is in the normal state, the first overheat state, or the second overheat state based on the heat temperature of the electronic device 201. For example, when the heat temperature is lower than a first specified temperature (e.g., a first temperature threshold), the processor 220 may identify the state of the electronic device 201 as the normal state. For example, when the heat temperature is equal to or higher than the first specified temperature and lower than a second specified temperature, the processor 220 may identify the state of the electronic device 201 as the first overheat state. For example, when the heat temperature is equal to or higher than the second specified temperature, the processor 220 may identify the state of the electronic device 201 as the second overheat state.

In operation 614, when the normal state is detected, the processor 220 according to an embodiment may perform normal (or unmodified) data processing in the normal state. For example, the processor 220 may perform data processing by the processor 220 without any artificial throttling or limitation. According to an embodiment, the data processing speed range available for the processor 220 may vary depending on the specification or performance of the processor 220 (e.g., as specified by a manufacturer).

In operation 616, when the first overheat state is detected (operation 612), the processor 220, according to an embodiment, may identify whether a specified event-based overheat control function has been activated (or a user activity-based overheat control function has been activated). For example, the specified event-based overheat control function may be set by default without requiring determination as to whether the specified event-based overheat control function is activated by the processor 220. When the specified event-based overheat control function is configured to be executed automatically (or by default), operation 616 may be omitted.

For example, when the specified event-based overheat control function has not been activated (or when there is no specified event-based overheat control function), the processor 220 may be configured to perform data processing based on a first data processing speed range regardless of occurrence of a specified event in the first overheat state. When the specified event-based overheat control function has been activated, the processor 220 may be configured to perform data processing based on a second data processing speed range in consideration of occurrence of a specified event in the first overheat state.

In operation 618, when the overheat function is not activated and the processor 220 does not perform the specified event-based overheat control (operation 618—No), the processor 220 may perform data processing in a second data processing speed range (e.g., a second clock frequency range or 0 Hz to 1.7 GHz) limiting a data processing speed, and the process may end.

In operation 620, when the processor 220 according to an embodiment does perform the specified event-based overheat control (operation 616—Yes), the processor 220 may perform data processing in the first data processing speed range (e.g., a first clock range or 0 Hz to 1.4 GHz) that imposes a greater limit and/or throttling on a data processing speed than the second data processing speed range (e.g., a second clock frequency range or 0 Hz to 1.7 GHz). For example, when the specified event-based overheat control function is performed, heat is generated during a time period in which the data processing speed is temporarily increased. Therefore, there may be a need to further restrict (decrease) the data processing speed range to reduce more heat than when the specified event-based overheat control function is not performed.

In operation 622, the processor 220 according to an embodiment may identify (or detect) occurrence of a specified event during the data processing in the first data processing speed range. For example, the specified event may include an event related to a user activity (or an operation of the electronic device based on interaction between the user and the electronic device 201) or an event generated by at least one piece of software (e.g., an operating system) being executed (e.g., executed) in the processor 220. For example, the processor 220 may identify the specified event that has occurred among at least one specified event. In operation 624, the processor 220 according to an embodiment may identify a time period and/or a data processing speed corresponding to the specified event (e.g., as per the Table 1 described above). For example, the processor 220 may identify a first time period and/or a first data processing speed for processing a first specified event based on desired performance level data (e.g., Table 1) corresponding to at least one specified event, which have been stored in the memory 230.

In operation 626, the processor 220 according to an embodiment may perform data processing based on the time period and/or the data processing speed corresponding to the specified event. For example, the processor 220 may perform data processing at the first data processing speed corresponding to the first specified event, while ignoring the first data processing speed range (or releasing the setting of the first data processing speed range, or temporarily releasing the first overheat state) during the first time period for processing the first specified event. In other words, the processor 220 may be configured to switch from the first data processing speed range (e.g., the overheat processing speed range) to the first data processing speed corresponding to the first specified event (e.g., the processing speed associated with the specified event, which is faster than the overheat processing speed range)(e.g., which may be interpreted as releasing the setting of the first data processing speed range, and/or as temporarily releasing the first overheat state) during the first time period for processing the first specified event.

When the time period corresponding to the specified event processing is not defined, and only the processing speed for processing the specified event is defined, the processor 220 may perform data processing at the processing speed corresponding to the specified event, while ignoring the first data processing speed range (or releasing the setting of the first data processing speed range, or temporarily releasing the first overheat state) during a time period in which the specified event I processed. In other words, when the time period corresponding to the specified event processing is not defined in tandem with the processing speed (e.g., as with the camera app in Table 1), the processor 220 may perform data processing at the processing speed corresponding to the specified event, without consideration of an expiration time period after which to revert the processor speed to the clock speeds associated with the overheat state.

In operation 628, the processor 220 according to an embodiment may perform data processing in the first data processing speed range based on expiration of the time period corresponding to the specified event. In other words, the processor 220 according to an embodiment may revert to the first data processing speed range (e.g., the overheat speed) from the first data processing speed (e.g., the faster speed associated with the specified event) based on expiration of the time period corresponding to the specified event.

In other embodiments, when the time period corresponding to the specified event processing is not defined, the processor 220 may revert to the first data processing speed range (e.g., the overheat speed) after the specified event completes processing.

In operation 630, based on identifying (or detecting) the second overheat state (as in operation 612—second overheat state), the processor 220 according to an embodiment may perform data processing in a third data processing speed range. For example, the third data processing speed range (e.g., a third clock frequency range or 0 Hz to 1.1 GHz) may be more limited than the first data speed range and the second data speed range. For example, a maximum processing speed value (or a maximum clock frequency value) of the third data processing speed range may be less than the maximum processing speed value of each of the respective first data processing speed range and the second data processing speed range.

According to various embodiments, a method of controlling overheat based on a user activity in an electronic device may include identifying whether the electronic device in a first overheat state based on a heat temperature of the electronic device obtained by using at least one temperature sensor in the electronic device, performing data processing in a first data processing speed range in the first overheat state, identifying a first time period and/or a first data processing speed corresponding to a first specified event, upon occurrence of the first specified event during the data processing in the first data processing speed range, performing data processing corresponding to the first specified event based on the first time period and/or the first data processing speed, and based on expiration of the first time period or completion of data corresponding to the first specified event, performing data processing in the first data processing speed range.

According to various embodiments, the method may further include, upon occurrence of a second specified event during the data processing in the first data processing speed range, identifying a second time period and/or a second data processing speed corresponding to the second specified event, performing data processing based on the second time period and/or the second data processing speed, and based on expiration of the second time period or completion of data processing corresponding to the second specified event, performing data processing in the first data processing speed range.

According to various embodiments, the method may further include, when a second data processing speed range is configured to be used in the first overheat state, performing data processing in the second data processing speed range, and a first maximum processing speed of the first data processing speed range may be less than a second maximum processing speed of the second data processing speed range.

According to various embodiments, in the method, based on the heat temperature of the electronic device, the electronic device may be identified to be in a normal state when the heat temperature is lower than a first specified temperature, the electronic device may be identified to be in the first overheat state when the heat temperature is equal to or higher than the first specified temperature and lower than a second specified temperature, and the electronic device may be identified to be in a second overheat state when the heat temperature is equal to or higher than the second specified temperature. The second specified temperature may be higher than the first specified temperature.

According to various embodiments, the method may further include performing data processing in a third data processing speed range in the second overheat state, and a third maximum processing speed of the third data processing speed range may be less than the first maximum processing speed of the first data processing speed range.

According to various embodiments, a memory of the electronic device may store at least one time period and/or at least one data processing speed corresponding to each of at least one specified event.

According to various embodiments, the at least one specified event may include an event related to an operation of the electronic device based on interaction between a user and the electronic device or an event occurring through at least one piece of software executed in at least one processor of the electronic device.

According to various embodiments, first data processing speed may include a clock frequency corresponding to the at least one processor of the electronic device.

According to various embodiments, the first specified temperature may be about 38 degrees Celsius, and the second specified temperature may be about 47 degrees Celsius.

Figure 7:
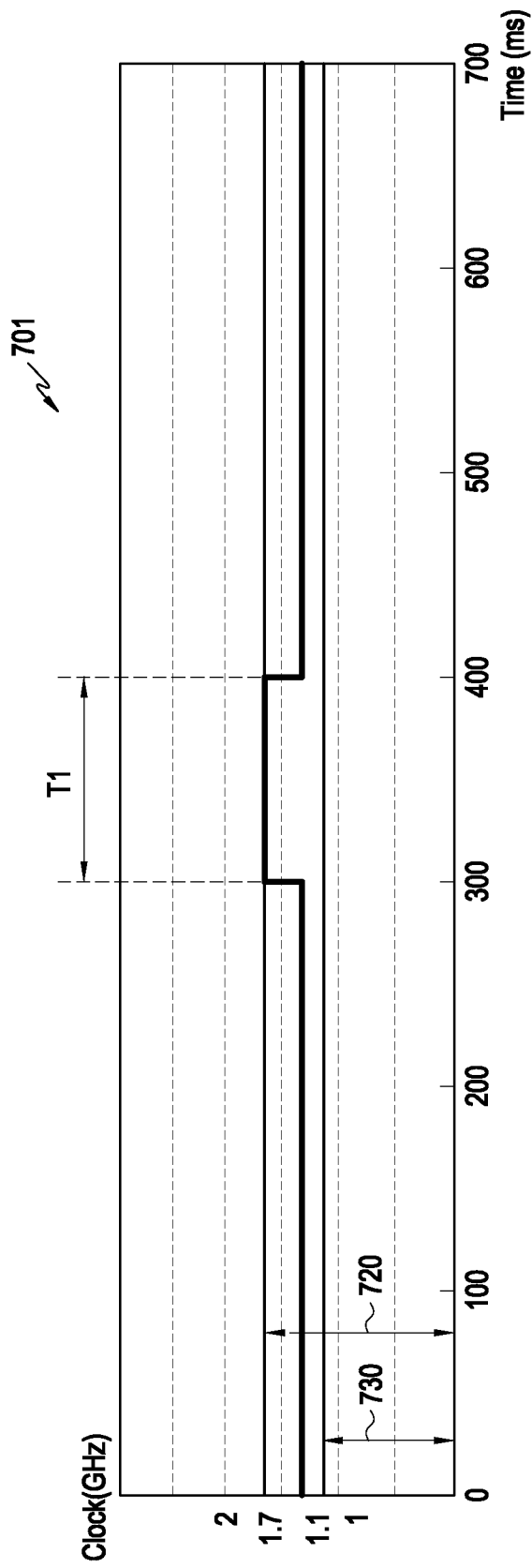
FIG. 7 is a diagram referred to for describing a second data processing speed range according to an embodiment.

FIG. 7 is a diagram referred to for describing a second data processing speed range according to an embodiment.

Referring to FIG. 7, in a graph 701 according to an embodiment, the X axis represents time (ms), and the Y axis represents a data processing speed (e.g., the clock speed or clock frequency of the processor (220)) (GHz). FIG. 7 includes a graph illustrating a data processing speed range, when the specified event-based overheat control function is deactivated in the first overheat state according to an embodiment. When the processor 220 according to an embodiment is configured not to perform the specified event-based overheat control function in a first overheat state in which a heat temperature is equal to or higher than a first specified temperature and lower than a second specified temperature, the processor 220 may perform data processing in a second data processing speed range 720 (e.g., a second clock frequency range (e.g., 0 Hz to 1.7 GHz)) even in a specified event occurrence period T1. In a second overheat state in which the heat temperature is equal to or higher than the second specified temperature, the processor 220 according to an embodiment may perform data processing in a third data processing speed range 730 (e.g., a third clock frequency range (e.g. 0 Hz to 1.1 GHz) more limited than the second data processing speed range 720.

Figure 8:
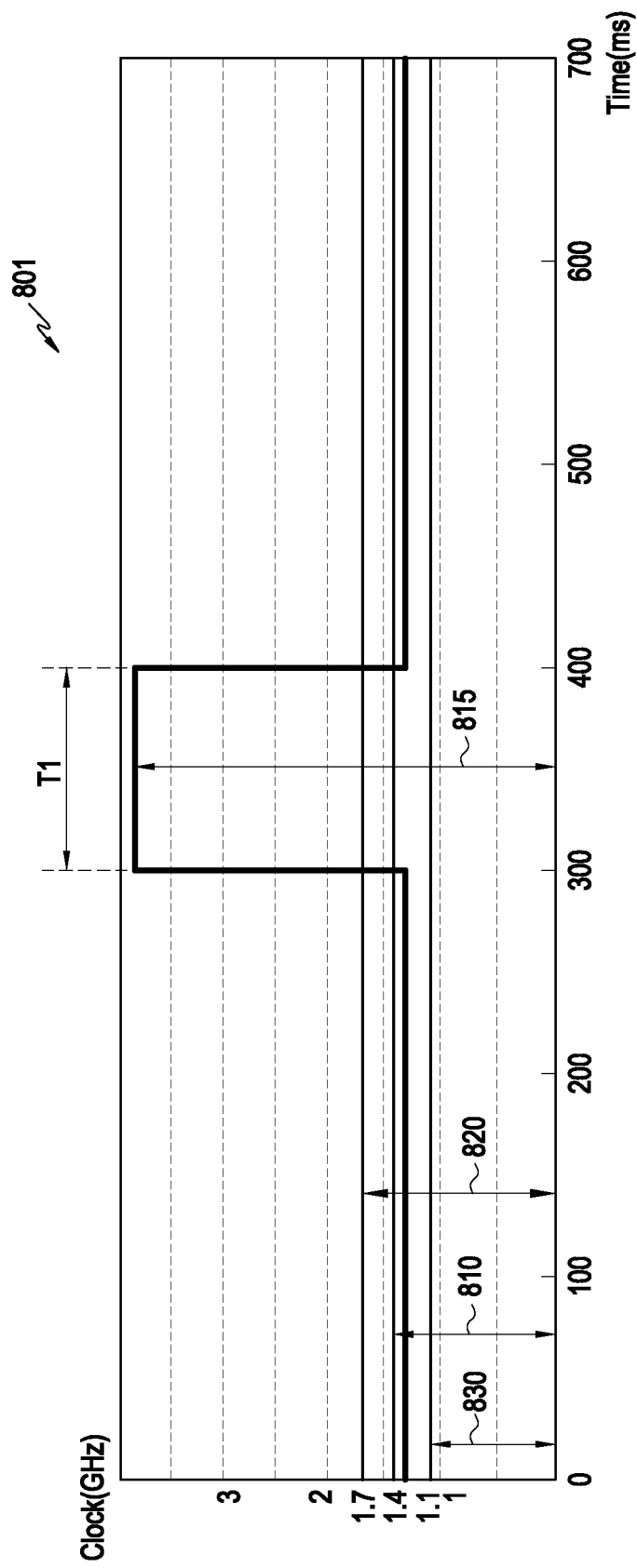
FIG. 8 is a diagram referred to for describing a first data processing speed range according to an embodiment.

FIG. 8 is a diagram referred to for describing a first data processing speed range according to an embodiment.

Referring to FIG. 8, in a graph 801 according to an embodiment, the X axis represents time (ms), and the Y axis represents a data processing speed (e.g., the clock speed or clock frequency of a processor (e.g., 220)) (GHz). FIG. 8 may illustrate a graph showing a data processing speed range, when the specified event-based overheat control function is activated in the first overheat state according to an embodiment. When the processor 220 according to an embodiment is configured to perform the specified event-based overheat control function in a first overheat state in which a heat temperature is equal to or higher than a first specified temperature and lower than a second specified temperature, the processor 220 may perform data processing in a first data processing speed range 810 (e.g., a first clock frequency range (e.g., 0 Hz to 1.4 GHz)) more limited than a second data processing speed range 820. In a second overheat state in which the heat temperature is equal to or higher than the second specified temperature, the processor 220 according to an embodiment may limit the data processing speed so that data processing is performed in a third data processing speed range 830 (e.g., a third clock frequency range (e.g. 0 Hz to 1.1 GHz)) more limited than the second data processing speed range 820. According to an embodiment, when the processor 220 is configured to perform specified event-based overheat control in the first overheat state, the processor 220 may perform data processing at a specified data processing speed 815 during a time period T1 corresponding to a specified event by temporarily releasing the first data processing speed range 810 during the specified event time period T1. According to an embodiment, as the processor 220 performs data processing at the specified data processing speed 815 during the time period T1 corresponding to the specified event temporarily without the limit of the first data processing speed range 810 in the first overheat state, a user-desired function (or an operation corresponding to the specified event) may be processed at a normal speed, without excessively raising heat temperature due to limited duration of operating the processor at the originate speeds.

Figure 9:
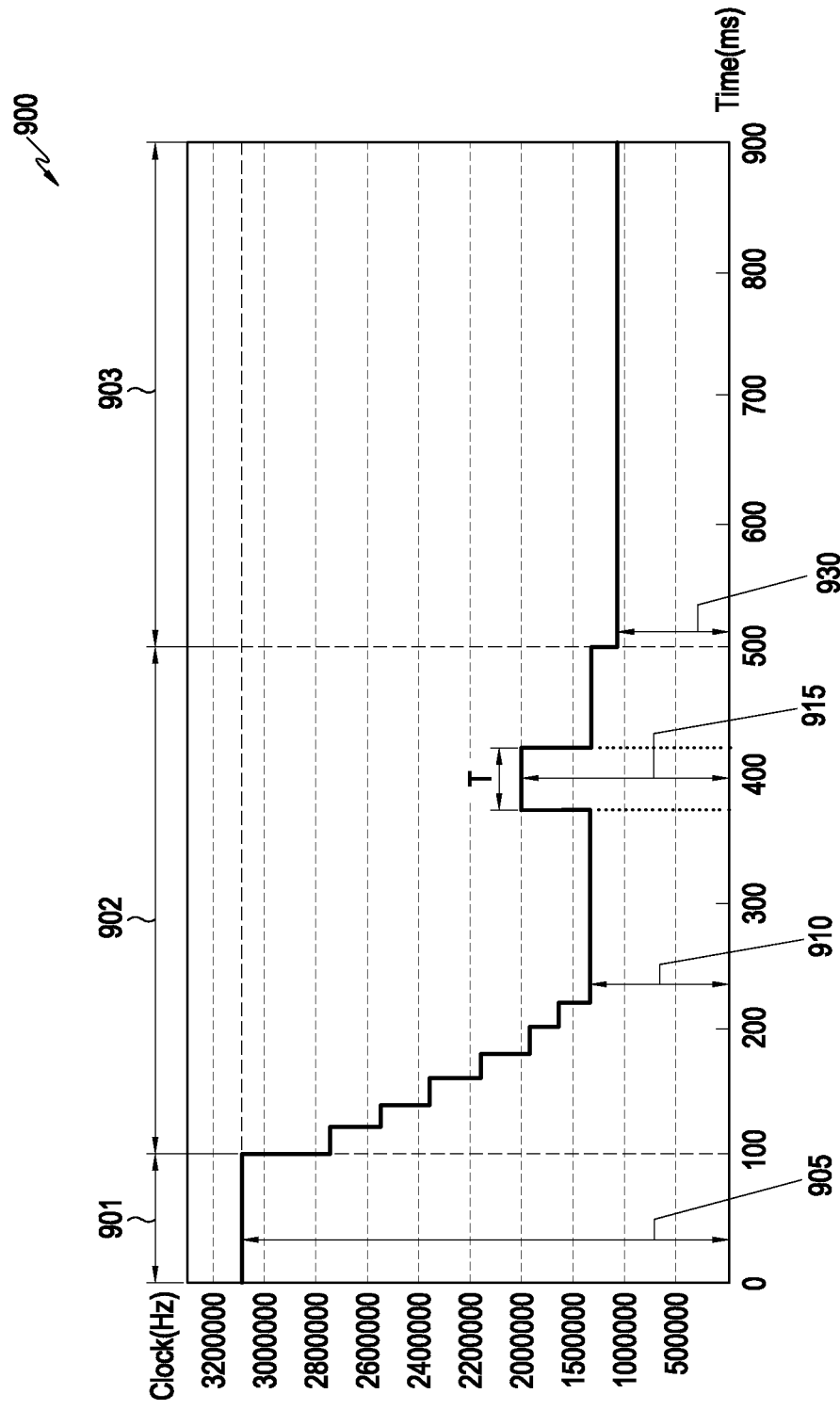
FIG. 9 is an example graph referred to for describing an operation of controlling overheat in a normal state, a first overheat state, and a second overheat state in an electronic device according to an embodiment.

FIG. 9 is an example graph referred to for describing an operation of controlling overheat in a normal state, a first overheat state, and a second overheat state in an electronic device according to an embodiment.

Referring to FIG. 9, in a graph 900 according to an embodiment, the X axis represents time (ms), and the Y axis represents a data processing speed (e.g., the clock speed or clock frequency of the processor (220)) (Hz). According to an embodiment, when a heat temperature is lower than a first specified temperature (e.g., about 38 degrees Celsius), the processor 220 may identify (or determine) a normal state 901. When the heat temperature is equal to or higher than the first specified temperature and lower than a second specified temperature (e.g., about 47 degrees Celsius), the processor 220 may identify (or determine) a first overheat state 902. When the heat temperature T is equal to or higher than the second specified temperature, the processor 220 may identify (or determine) a second overheat state 903.

According to an embodiment, the processor 220 may process data in a data processing speed range 905 (e.g., a maximum clock frequency range (e.g., 0 Hz to 3.1 GHz)) available to the processor 220, without artificial limits on a data processing speed.

According to an embodiment, when the first overheat state 902 is detected, the processor 220 may gradually decrease the data processing speed and process data in a first data processing speed range 910 (e.g., an overheat state based speed range, which is a lower first clock frequency range than the original speed range; e.g., 0 Hz to 1.4 GHz).

According to an embodiment, when the second overheat state 930 is detected, the processor 220 may gradually decrease the data processing speed to a third data processing speed range 930 (e.g., a third clock frequency range lower than even the first processing speed range; e.g., 0 Hz to 1.1 GHz).

According to an embodiment, when the processor 220 identifies that a specified event has occurred while the processor is set to operate in the first data processing speed range 910 in the first overheat state 902, the processor 220 may be set to utilize a faster data processing speed 915 corresponding to the specified event for a limited time period T corresponding to the specified event. According to an embodiment, upon expiration of the time period T corresponding to the specified event, the processor 220 may revert from the faster processing speed 915 back to the slower first data processing speed range 910.

Figure 10:
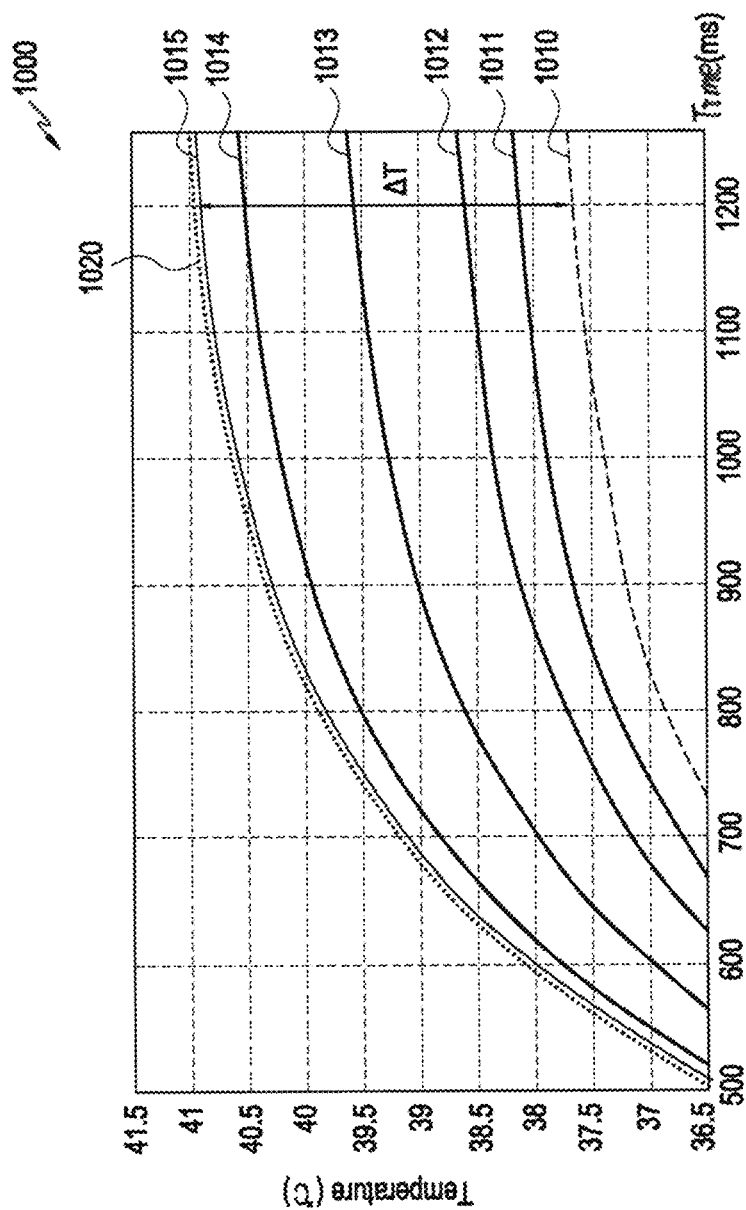
FIG. 10 is a diagram referred to for describing an example time period setting corresponding to a specified event according to an embodiment.

FIG. 10 is a diagram referred to for describing an example of setting a time period corresponding to a specified event according to an embodiment.

Referring to FIG. 10, in a graph 1000 according to an embodiment, the X axis may represent time (ms), and the Y axis may represent a temperature (° C.). According to an embodiment, when the processor 220 performs data processing (e.g., data processing for reproducing video data) in a first data processing speed range (e.g., a first clock frequency range (e.g., 0 Hz to 1.4 GHz)), a heat temperature may rise as shown in a first heat temperature increase curve 1010. According to an embodiment, when the processor 220 performs data processing for video data reproduction in a second data processing speed range (e.g., a second clock frequency range (e.g., 0 Hz to 1.7 GHz)), the heat temperature may rise as shown in a second heat temperature increase curve 1020. For example, a first heat temperature (e.g., 37.7 degrees Celsius) after a predetermined time (e.g., 1400 ms) in the case of data processing of the processor 220 in the first data processing speed range more limited than the second data processing speed range may be lower than a second heat temperature (e.g., 41 degrees Celsius) after a predetermined time (e.g., 1200 ms) in the case of data processing of the processor 220 in the second data processing speed range. For example, there may be an extra temperature corresponding to the difference 7 (e.g., 5.4 degrees Celsius) in heat temperature between the second heat temperature when the processor 220 processes data in the second data processing speed range, and the first heat temperature when the processor 220 processes data in the first data processing speed range. A heat temperature increase caused by the data processing for the specified event may be counterbalanced by as much as the extra temperature. The processor 220 according to an embodiment may compare a first temperature change in the case of data processing corresponding to a specified event during a predetermined time during data processing in the first data processing speed range with a second temperature change in the case of data processing in the second data processing speed range. When the temperature difference between the first temperature change and the second temperature change is equal to or less than a specified value (e.g., when the heat temperatures become the same (or similar within a specified error range), the processor 220 according to an embodiment may set the predetermined time period as a time period corresponding to the specified event.

For example, when the processor 220 releases the limit of the first data processing speed range during a first time period (e.g., 3 seconds) and performs data processing corresponding to a scroll event, during data processing for video data reproduction in the first data processing speed range, the heat temperature may increase as shown in a third heat temperature increase curve 1011. According to an embodiment, when the processor 220 releases the limit of the first data processing speed range during a second time period (e.g., 6 seconds) and performs the data processing corresponding to the scroll event, during the data processing for video data reproduction in the first data processing speed range, the heat temperature may increase as shown in a fourth heat temperature increase curve 1012. According to an embodiment, when the processor 220 releases the limit of the first data processing speed range during a third time period (e.g., 12 seconds) and performs the data processing corresponding to the scroll event, during the data processing for video data reproduction in the first data processing speed range, the heat temperature may increase as shown in a fifth heat temperature increase curve 1013. According to an embodiment when the processor 220 releases the limit of the first data processing speed range during a fourth time period (e.g., 18 seconds) and performs the data processing corresponding to the scroll event, during the data processing for video data reproduction in the first data processing speed range, the heat temperature may increase as shown in a sixth heat temperature increase curve 1014. According to an embodiment when the processor 220 releases the limit of the first data processing speed range during a fifth time period (e.g., 20 seconds) and performs the data processing corresponding to the scroll event, during the data processing for video data reproduction in the first data processing speed range, the heat temperature may increase as shown in a seventh heat temperature increase curve 1015. According to an embodiment, based on a temperature change equal to the second heat temperature increase curve 1020 (or similar to the second heat temperature increase curve 1020 within a specified error range), like the seventh heat temperature increase curve 1015, the processor 220 may set (or determine) a time period for the scroll event to (or to be) 20 seconds.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term 'non-transitory' simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, a non-volatile storage medium may store instructions configured to, when executed by at least one processor, cause the at least one processor to perform at least one operation. The at least one operation may include identifying a first overheat state based on a heat temperature of an electronic device obtained by using at least one temperature sensor, performing data processing in a first data processing speed range in the first overheat state, identifying a first time period and/or a first data processing speed corresponding to a first specified event, upon occurrence of the first specified event during the data processing in the first data processing speed range, performing data processing corresponding to the first specified event based on the first time period and/or the first data processing speed, and based on expiration of the first time period or completion of data processing corresponding to the first specified event, performing data processing in the first data processing speed range.

The embodiments of the disclosure described and illustrated in the present specification and the drawings are merely provided as specific examples to easily explain the technical content according to the embodiments of the disclosure and help the understanding of the embodiments of the disclosure, not intended to limit the scope of the embodiments of the disclosure. Therefore, the scope of various embodiments of the disclosure should be interpreted as encompassing all changes or modifications derived from the technical idea of various embodiments of the disclosure as well as the embodiments of the disclosure.

What is claimed is:

1. An electronic device comprising:
at least one temperature sensor;
a memory; and
at least one processor operatively coupled to the at least one temperature sensor and the memory,
wherein the memory stores instructions configured to, when executed, enable the at least one processor to:
identify whether the electronic device is in a first overheat state based on a heat temperature of the electronic device obtained by using the at least one temperature sensor,
perform data processing in a first data processing speed range in the first overheat state,
identify a first time period and a first data processing speed corresponding to a first specified event, wherein the first data processing speed exceeds the first data processing speed range,
upon occurrence of the first specified event during the data processing in the first data processing speed range, perform data processing corresponding to the first specified event based on the first time period and the first data processing speed, while the electronic device is in the first overheat state, and
perform data processing in the first data processing speed range based on expiration of the first time period or completion of data processing corresponding to the first specified event.

2. The electronic device of claim 1, wherein the instructions are configured to, when executed, enable the at least one processor further to identify a second time period and/or a second data processing speed corresponding to a second specified event, upon occurrence of the second specified event during the data processing in the first data processing speed range, perform data processing based on the second time period and/or the second data processing speed, and perform data processing in the first data processing speed range based on expiration of the second time period or completion of data processing corresponding to the second specified event.

3. The electronic device of claim 1, wherein the instructions are configured to, when executed, enable the at least one processor further to perform data processing in a second data processing speed range, when the second data processing speed range is configured to be used in the first overheat state, and wherein a first maximum processing speed of the first data processing speed range is less than a second maximum processing speed of the second data processing speed range.

4. The electronic device of claim 3, wherein the instructions are configured to, when executed, enable the at least one processor to, based on the heat temperature of the electronic device, identify the electronic device to be in a normal state when the heat temperature is lower than a first specified temperature, identify the electronic device to be in the first overheat state when the heat temperature is equal to or higher than the first specified temperature and lower than a second specified temperature, and identify the electronic device to be in a second overheat state when the heat temperature is equal to or higher than the second specified temperature, and
wherein the second specified temperature is higher than the first specified temperature.

5. The electronic device of claim 4, wherein the instructions are configured to, when executed, enable the at least one processor to perform data processing in a third data processing speed range in the second overheat state, and
wherein a third maximum processing speed of the third data processing speed range is less than the first maximum processing speed of the first data processing speed range.

6. The electronic device of claim 1, wherein the memory stores at least one time period and/or at least one data processing speed corresponding to each of at least one specified event.

7. The electronic device of claim 6, wherein the at least one specified event includes an event related to an operation of the electronic device based on interaction between a user and the electronic device or an event occurred through at least one piece of software executed in the at least one processor.

8. The electronic device of claim 1, wherein the first data processing speed includes a clock frequency corresponding to the at least one processor.

9. The electronic device of claim 4, wherein the first specified temperature is 38 degrees Celsius, and the second specified temperature is 47 degrees Celsius.

10. A method of controlling overheat based on a user activity in an electronic device, the method comprising:
identifying whether the electronic device is in a first overheat state based on a heat temperature of the electronic device obtained by using at least one temperature sensor in the electronic device;
performing data processing in a first data processing speed range in the first overheat state;
identifying a first time period and a first data processing speed corresponding to a first specified event, wherein the first data processing speed is higher than the first data processing speed range;
upon occurrence of the first specified event during the data processing in the first data processing speed range, while the electronic device is in the overheat state;
performing data processing corresponding to the first specified event based on the first time period and the first data processing speed; and
based on expiration of the first time period, performing data processing in the first data processing speed range.

11. The method of claim 10, further comprising:
upon occurrence of a second specified event during the data processing in the first data processing speed range, identifying a second time period and/or a second data processing speed corresponding to the second specified event;
performing data processing based on the second data processing speed during the second time period; and
based on expiration of the second time period or completion of data processing corresponding to the second specified event, performing data processing in the first data processing speed range.

12. The method of claim 10, further comprising, when a second data processing speed range is configured to be used in the first overheat state, performing data processing in the second data processing speed range,
wherein a first maximum processing speed of the first data processing speed range is less than a second maximum processing speed of the second data processing speed range.

13. The method of claim 12, further comprising:
based on the heat temperature of the electronic device, identifying that the electronic device is in a normal state when the heat temperature is lower than a first specified temperature, identifying that the electronic device is in the first overheat state when the heat temperature is equal to or higher than the first specified temperature and lower than a second specified temperature, and identifying that the electronic device is in a second overheat state when the heat temperature is equal to or higher than the second specified temperature, and wherein the second specified temperature is higher than the first specified temperature.

14. The method of claim 13, further comprising performing data processing in a third data processing speed range in the second overheat state,
wherein a third maximum processing speed of the third data processing speed range is less than the first maximum processing speed of the first data processing speed range.

15. The method of claim 10, wherein a memory of the electronic device stores at least one time period and/or at least one data processing speed corresponding to each of at least one specified event.

16. The method of claim 15, wherein the at least one specified event includes an event related to an operation of the electronic device based on interaction between a user and the electronic device or an event occurring through at least one piece of software executed in at least one processor of the electronic device.

17. The method of claim 10, wherein the first data processing speed includes a clock frequency corresponding to at least one processor of the electronic device.

18. The method of claim 13, wherein the first specified temperature is 38 degrees Celsius, and the second specified temperature is 47 degrees Celsius.

19. A non-transitory storage medium storing instructions configured to, when executed by at least one processor, cause the at least one processor to perform at least one operation, wherein the at least one operation includes:
identifying whether a electronic device is in a first overheat state based on a heat temperature of an electronic device obtained by using at least one temperature sensor;
performing data processing in a first data processing speed range in the first overheat state;
identifying a first time period and a first data processing speed corresponding to a first specified event, wherein the first data processing speed exceeds the first data processing speed range;

upon occurrence of the first specified event during the data processing in the first data processing speed range, while the electronic device is in the first overheat state;

performing data processing corresponding to the first specified event based on the first time period and the first data processing speed; and based on expiration of the first time period or completion of data processing corresponding to the first specified event, performing data processing in the first data processing speed range.

20. The non-transitory storage medium of claim 19, wherein the at least one operation further includes:

upon occurrence of a second specified event during the data processing in the first data processing speed range, identifying a second time period and/or a second data processing speed corresponding to the second specified event;

performing data processing based the second time period and/or the second data processing speed; and based on expiration of the second time period or completion of data processing corresponding to the second specified event, performing data processing in the first data processing speed range.

* * * * *